Feb. 13, 1962 O. G. BARNES 3,020,831
APPARATUS FOR APPLYING CIRCUMFERENTIAL
PRESSURE ON THE PERIPHERY OF A
CIRCULAR OBJECT
Filed Sept. 4, 1958 2 Sheets-Sheet 1

OLIVER G. BARNES
INVENTOR.

BY R. T. Sperry
Attorney

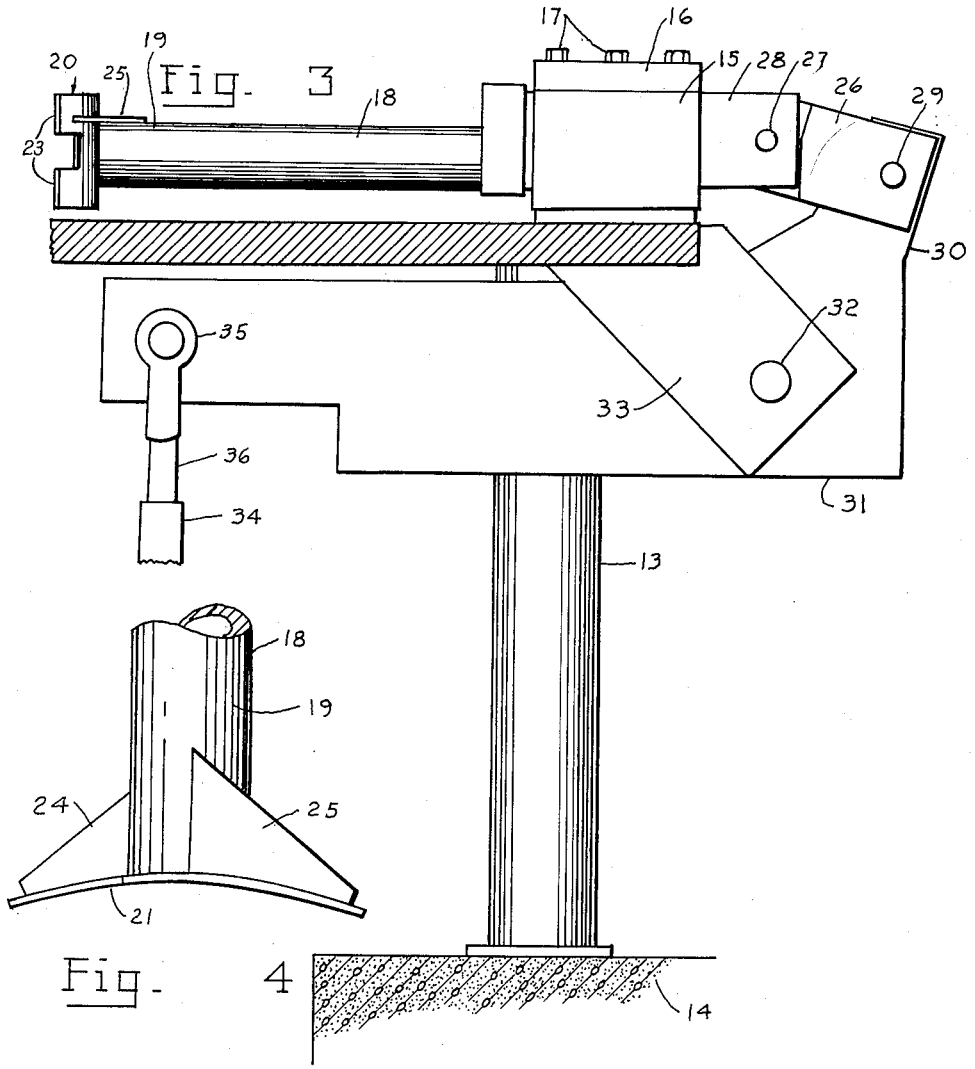
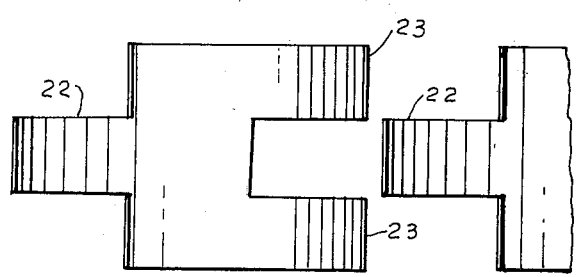
Fig. 3
Fig. 4
Fig. 5
OLIVER G. BARNES
INVENTOR.

United States Patent Office 3,020,831
Patented Feb. 13, 1962

3,020,831
APPARATUS FOR APPLYING CIRCUMFERENTIAL PRESSURE ON THE PERIPHERY OF A CIRCULAR OBJECT
Oliver G. Barnes, Limona, Fla.
Filed Sept. 4, 1958, Ser. No. 759,008
3 Claims. (Cl. 100—232)

This invention relates to an assembly apparatus and is particularly concerned with apparatus for applying circumferential pressure on the periphery of a circular object. While the invention is not limited nor confined to any one particular type of operation and while it may find general utility in numerous manufacturing or repair procedures, it is here shown as used in the inward radial compression of a circular series of tire forming elements of the type referred to in the co-pending application of Bernard P. Smith, filed August 11, 1958, Serial No. 754,189, and entitled Tire Assembly, Assembly Element and Method of Assembling.

In the manufacture of a substantially solid vehicle tire, of the type shown in said co-pending application, individual flexible elements are threaded upon an internal core in a circular series, inwardly directed or radial circumferential pressure is then applied, preferably uniformly about the outer face of the assembled elements and there-through to the core whereby the opposite end of the core may be brought together and united to form a supporting and sustaining circular band within the tire, uniting the individual elements under pressure. In this and like operations where inwardly directed circumferential pressure is desired, difficulty has been experienced in providing a simple, effective and efficient apparatus by which such pressure may be uniformly applied throughout the entire periphery. Heretofore, some cable mechanisms have been employed by which circular pressure has been exerted by drawing together the end of encircling cables. Such devices are not only difficult and cumbersome of manipulation, but the pressure applied tends to concentrate at specific circumferential areas rather than as a uniform radial inward force. Similarly, where continuous transversely rigid bands have been employed, uniformity of pressure about the periphery of the object has not been ideal. In the present invention such difficulties are overcome by the use of individual, closely adjacent, radially disposed pressure plungers, each arranged to apply its own individual pressure at an area of the tire periphery. One important feature of the invention is the construction and arrangement of tire engaging heads for the plungers by which the pressure areas of the heads overlap to insure complete peripheral contraction of the tire as the plungers move inwardly each in its own radial path of travel. Another important feature of the invention is the provision of means for uniformly and simultaneously moving the plungers in their radial thrust so that the application of pressure is not only continuous throughout the entire periphery of the tire, but such pressure is uniform and the compression symmetrical.

It is, therefore, among the objects of the invention to provide a novel and improved assembly apparatus which is simple, effective and efficient, well designed to meet the demands of economic manufacture and operation and one adapted for the uniform application of pressure and circumferential compression throughout the entire peripheral surface of a circular object.

These and other objects, features and advantages of the invention will be apparent from a consideration of the following specification taken in conjunction with the accompanying drawings, in which:

FIGURE 3 is an enlarged fragmentary detail section illustrating one of the pressure plungers and its motivating means, FIGURE 4 is a detail top plan view of one of the pressure heads, and FIGURE 5 is a front elevation of the head of FIGURE 4 with a fragmentary view of a portion of an adjacent head.

Figure 1:
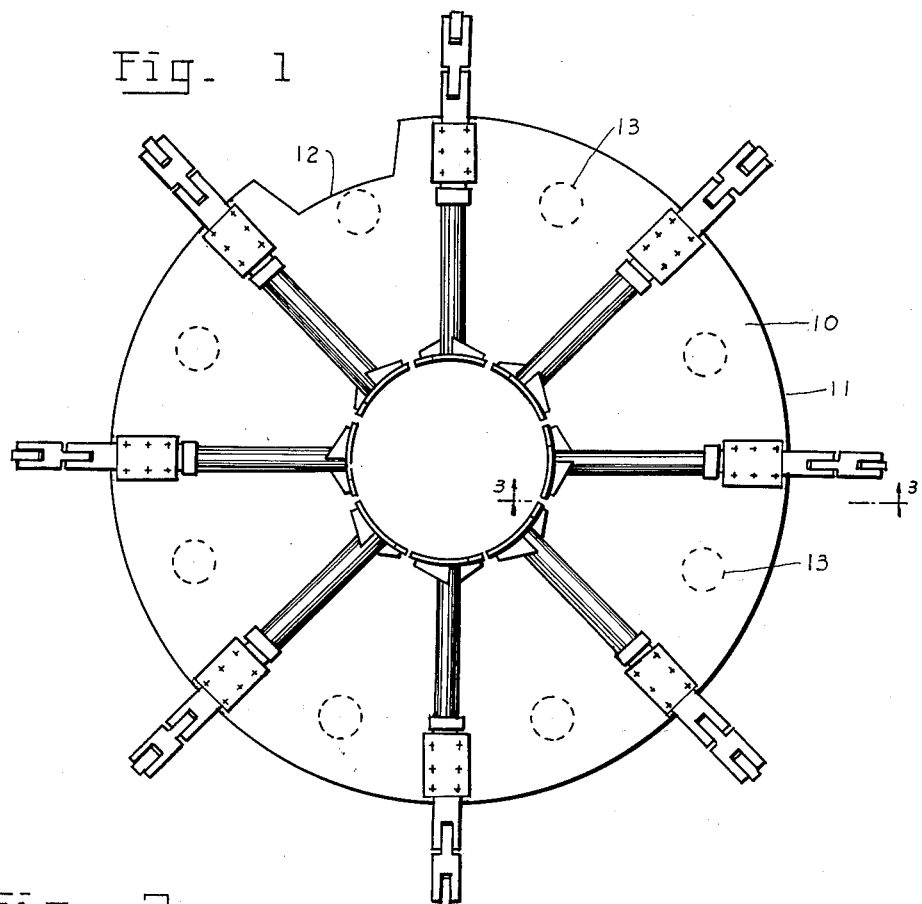
FIGURE 1 is a top plan view of one embodiment of the present invention.
Figure 2:
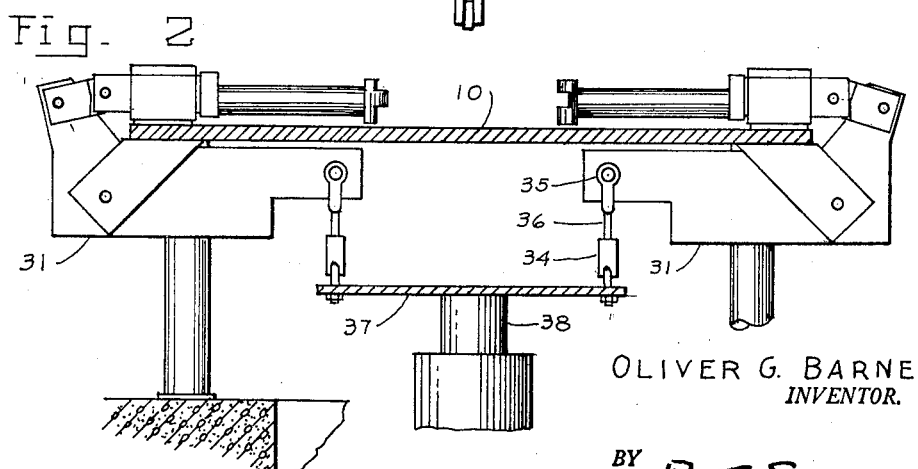
FIGURE 2 is a central vertical section of that form of the apparatus shown in FIGURE 1.

That form of the invention here shown by way of example in the drawings may be generally defined as including a circular flat work table or platten 10, one portion of the periphery 11 of which may be recessed as at 12 to accommodate an operator so as to facilitate free access to the central area of the table. The table 10 may be supported in elevated horizontal position in any suitable manner, vertical leg standards 13 being here shown as mounted from a concrete base 14 and extending upwardly therefrom to engage the table. On the upper face of the table arranged in circular spaced relation adjacent the periphery 11, there is provided a series of plunger bearing blocks 15, the caps 16 of which may be secured thereon by the bolts 17. It will be understood that the series of bearing blocks 15 are uniformly arranged in circumferential spaced relation, the number and spacing being determined by the size of the device and by the size of the work piece (not shown). Slideably mounted and supported in each of the plunger bearing blocks 15 is a radially extending plunger 18, the plungers being directed inwardly towards the center of the table 10 and being fitted at their inner ends 19 with pressure heads 20 shown in detail in FIGURES 4 and 5. Since, as will be hereinafter more fully set forth, the heads 20 constitute work periphery engaging devices with extended work contacting surfaces, the number and spacing of the plungers 18 and bearing blocks 15 may be materially reduced without loss of the application of full peripheral pressure.

Referring now to FIGURES 4 and 5, it will be seen that the heads 20 are formed with arcuate concave innerface surfaces 21 disposed in vertical position normal to and upwardly spaced from the top surface of the table 10. The heads are secured centrally of the plungers and extend outwardly therefrom. Each head is formed with a central lateral finger 22 on one side of the plunger while the opposite side is formed with spaced furcations 23. As will be noted from FIGURE 5, the spacing between the furcations 23 is at least as wide as the finger 22 of the next adjacent head. Thus as the heads move inwardly, the fingers and furcations interdigitate to form a full arc of circular contact with the work piece. For giving strength and rigidity to the fingers and furcations, webs 24 and 25 respectively are joined between the outer faces of these lateral portions and the plungers.

Radial recpirocation of the plungers 18 is effected by means of links 26 pivotally engaged by pins 27 between the side walls 28 of outer plunger clevises 28 and pivotally engaged by pins 29 to the upwardly extending arms 30 of radially disposed rocker beams 31. The beams 31 are mounted for rocking motion on pivot pins 32 mounted through downwardly and outwardly inclined supports 33 rigidly secured to the table 10. It will, of course, be understood that there is one set of beams and links for each plunger and that as the beam is rocked in counterclockwise motion, as seen in FIGURE 3, the link will force the plunger inward, causing its head to compress the work piece and bringing about an interdigitation of the head fingers and furcations. Conversely, as the beams are rocked in the opposite direction with their inner ends 34 moving upwardly, the plungers will move radially outward to relieve pressure applied by the heads.

For uniformly and simultaneously moving the beams, and thus the plungers and heads, each beam end 34 is engaged as at 35 by the upper end of a cable or tie rod 36, the lower ends of each of which are secured adjacent the periphery of the head 37 of the piston 38 mounted within an hydraulic ram cylinder. Therefore, as the pressure within the cylinder is controlled, the head 37 may be moved vertically to simultaneously rock the beams 31 with uniform amplitude of motion and thus move the plungers inwardly or outwardly to affect compression or release of a work piece by the heads 20.

From the foregoing it will be seen that the present invention provides a simple rugged and durable instrumentality for the application of uniform compression to circular work pieces. It will be understood that in the practice of the invention, numerous changes, modifications and the full use of equivalents may be resorted to without departure from the spirit or scope of the invention as outlined in the appended claims.

What I claim is:

1. A pressure head for the radial plunger of a circumferential press including, an arcuate pressure delivering surface and means on said head for interaction with similar adjacent heads to produce complete circumferential pressure throughout the entire periphery of a circular work object, said means including fingers and furcations, said fingers and furcations extended laterally from the opposite side of the head in an arcuate plane, and being constructed and arranged to permit interdigitation with the fingers and furcations of similar next adjacent heads.

2. An apparatus for applying uniform inward radial compression to a circular series of tire forming elements including a circular horizontal table, a circular series of equally spaced radially extending bearing blocks on such table, radially reciprocating plungers mounted through said bearing blocks, arcuate pressure heads on the inner ends of each plunger each head including laterally extending portions interfitting upon inward movement with like portions of adjacent heads, links connected with the outer ends of each plunger, rocker beams engaging said links, means depending from the periphery of said table for pivotally supporting said rocker beams, a single vertical hydraulic ram centrally located below said table and individual means engageable between said ram and said beams to simultaneously rock said beams and hence move said plungers uniformly.

3. An apparatus for applying uniform inward radial compression to a circular series of tire forming elements including a circular horizontal table, a circular series of equally spaced radially extending bearing blocks on such table, radially reciprocating plungers mounted through said bearing blocks, arcuate pressure heads on the inner ends of each plunger each head including laterally extending fingers and furcations adapted for interdigitation upon inward movement of the heads with like fingers and furcations of adjacent heads, a link connected with the outer ends of each plunger, a rocker beam engaging each link, means depending from the periphery of said table for pivotally supporting said rocker beams, a single vertical hydraulic ram centrally located below said table and separate individual adjustable links between said ram and said beams to simultaneously rock said beams and hence move said plunger uniformly.

References Cited in the file of this patent

UNITED STATES PATENTS

| 941,543 | Sistek et al. | Nov. 30, 1909 |
| 978,976 | Wolff | Dec. 20, 1910 |
| 1,167,009 | Nall | Jan. 14, 1916 |
| 1,246,557 | Crowder | Nov. 13, 1917 |
| 1,738,504 | Stevens | Dec. 3, 1929 |
| 2,253,713 | Lancaster | Aug. 26, 1941 |
| 2,317,440 | Cannon | Apr. 27, 1943 |
| 2,434,607 | Carruthers | Jan. 13, 1948 |
| 2,682,908 | Schultz | July 6, 1954 |
| 2,712,850 | Rerick | July 12, 1955 |

FOREIGN PATENTS

| 496,508 | France | Nov. 8, 1919 |